(12) United States Patent
Hoefmans et al.

(10) Patent No.: US 12,503,164 B2
(45) Date of Patent: Dec. 23, 2025

(54) TRAILER STROKE EXTENDER AND HYDRAULIC TRAILER SYSTEM

(71) Applicant: Mammoet Holding B.V., Utrecht (NL)

(72) Inventors: Ronald Adrianus Cornelis Hoefmans, Molenschot (NL); Quintin De Jager, Rotterdam (NL)

(73) Assignee: MAMMOET HOLDING B.V., Utrecht (NL)

( * ) Notice: Subject to any disclaimer, the term of this patent is extended or adjusted under 35 U.S.C. 154(b) by 207 days.

(21) Appl. No.: 18/230,948

(22) Filed: Aug. 7, 2023

(65) Prior Publication Data

US 2024/0075985 A1 Mar. 7, 2024

(30) Foreign Application Priority Data

Sep. 7, 2022 (NL) ...................................... 2032977

(51) Int. Cl.
*B62D 21/14* (2006.01)
(52) U.S. Cl.
CPC .................................. *B62D 21/14* (2013.01)
(58) Field of Classification Search
CPC ........ B62D 21/14; B62D 21/02; B62D 21/03; B62D 21/09; B62D 21/20; B62D 27/00; B62D 65/02

(Continued)

(56) References Cited

U.S. PATENT DOCUMENTS

| 5,375,866 A | * | 12/1994 | Wagner | ................ B62D 53/068 280/405.1 |
| 8,695,998 B1 | * | 4/2014 | Karel | ..................... B62D 61/12 280/86.5 |

(Continued)

FOREIGN PATENT DOCUMENTS

| CN | 220662629 U | * | 3/2024 | ............. B62D 21/02 |
| DE | 102012018575 A1 | | 3/2014 | |

(Continued)

OTHER PUBLICATIONS

Search Report and Written Opinion in counterpart Appl. NL 2032977, mailed May 1, 2023, 7-pgs.

(Continued)

*Primary Examiner* — James A Shriver, II
(74) *Attorney, Agent, or Firm* — Cabello Hall Zinda, PLLC

(57) ABSTRACT

The present disclosure pertains to a trailer stroke extender for use in a hydraulic trailer system, adapted to be arranged between a first hydraulic trailer and a second hydraulic trailer. The system comprises a cradle frame and first and second hydraulic cylinders. The cradle frame has a first cradle-to-beam connector adapted to be connected to the first hydraulic trailer and has a second cradle-to-beam connector adapted to be connected to the second hydraulic trailer. The first and the second cradle-to-beam connectors are spaced apart from each other in a longitudinal direction of the trailer stroke extender. The first and second hydraulic cylinders are adapted to move a trailer load in a vertical direction relative to the cradle frame over a single stroke length. The hydraulic cylinders are arranged in the cradle frame at a distance from each other in a lateral direction of the trailer stroke extender.

16 Claims, 7 Drawing Sheets

(58) Field of Classification Search
USPC .......................................................... 280/656
See application file for complete search history.

(56) References Cited

U.S. PATENT DOCUMENTS

| | | | | |
|---|---|---|---|---|
| 9,527,539 | B1* | 12/2016 | Hellbusch | A01D 75/002 |
| 10,759,321 | B1* | 9/2020 | Cook, Jr. | B62D 63/061 |
| 10,875,590 | B2* | 12/2020 | Lutz | B62D 13/04 |
| 11,370,482 | B2* | 6/2022 | Lutz | B62D 13/02 |
| 12,030,562 | B2* | 7/2024 | Lippi | B60G 11/265 |
| 2006/0119080 | A1* | 6/2006 | Damron | A01G 23/095 |
| | | | | 280/656 |
| 2009/0311044 | A1* | 12/2009 | Groeneweg | E01F 15/148 |
| | | | | 404/6 |
| 2012/0200063 | A1* | 8/2012 | Oliphant | B62D 21/20 |
| | | | | 280/404 |
| 2018/0339736 | A1* | 11/2018 | Lutz | B60P 3/40 |
| 2024/0075985 | A1* | 3/2024 | Hoefmans | B62D 21/14 |

FOREIGN PATENT DOCUMENTS

| | | | | |
|---|---|---|---|---|
| DE | 102021001083 A1 * | 9/2022 | | B60P 3/40 |
| EP | 2974905 A1 | 1/2016 | | |
| NL | 2025942 B1 | 3/2022 | | |
| WO | WO-2008046229 A1 * | 4/2008 | | F04B 41/00 |
| WO | WO-2022002936 A1 * | 1/2022 | | B66F 1/02 |

OTHER PUBLICATIONS

Evidence D4, Scheuerle, "SPMT—Self-Propelled Modular Transporters," dated Apr. 2010, 8 pgs.
Evidence D4-A1, Scheuerle Vehicle Factory GmbH, "Invoice: DIN A4 Brochures," dated Nov. 24, 2010, 1 pg.
Evidence D4-A2, Scheuerle, "SPMT—Self-Propelled Modular Transporters," Product Brochure, dated Mar. 2014, 8 pgs.
Evidence D4-A3, Scheuerle, webpage for download of Scheurle Brochures, www.scheuerle.com, dated Apr. 25, 2011, 1 pg.
Evidence D5, Scheuerle, "Our Budget Offer: Lifting Device for Scheuerle SPMT units," Letter from Head of Sales Administration, dated May 4, 2010, 13 pgs.
Evidence D5-A1, Scheuerle-Fahrzeugfabrik GMBH, "Hubtisch 400t NL," Schematic, dated Feb. 5, 2010, 1 pg.
Evidence D5-A2, Scheuerle Fahrzeugfabrik GmbH, "Hubtisch 2-file SPMT," Drawing Layout, dated Feb. 5, 2010, 1 pg.
Evidence D5-A3, Scheuerle Fahrzeugfabrik GmbH, "Hubtisch 4file SPMT," Drawing Layout, dated Feb. 5, 2010, 1 pg.
Evidence D5-A4, Saville, M., Email from Sales Assistant for Scheuerle, dated May 10, 2010, 1 pg.
Evidence D6-A1, Scheuerle, "Spacer Mit Hubeinrichtung, 100 TO," Drawing Files, undated, 4 pgs.
Evidence D6-A2, Pictures, undated, 3 pgs.
Evidence D6-A3, Scheuerle Fahrzeugfabrik GmbH, "Stand—Layout Bauma 2013," Drawing Layout, dated Nov. 29, 2012, 32 pgs.
Evidence D6-A4, Pictures, undated, 12 pgs.
Evidence D6-A5, Scheuerle, "Kamag," undated, 2 pgs.
Evidence D6-A6, TII Group, "TII Group with Scheuerle, Nicolas and KAMAG—positive review of bauma 2013," Prese Release dated May 2013, 15 pgs.
Evidence D7-A1, Mammoet, "One-of-a-kind Innovation Beats Project Schedule," webpage obtained from www.mammoet.com, undated, 3 pgs.
Evidence D7-A2, Wayback Machine of webpage entitled "One-of-a-kind Innovation Bests Project Schedule," dated Jun. 13, 2022.
Evidence D7-A3, Mammoet, Youtube webpage for video entitled "Mammoet Veranda Street Bridge Replacement," downloaded from www.youtube.com, showing 606 views with date Jun. 13, 2022, 1 pg.
Evidence D7-A4, Screenshot from Youtube video captured at minute 0:39 from Evidence D7, 1 pg.
Evidence D8, Wikipedia, "Hydraulikzylinder," downloaded from wikipedia.org, undated, 5 pgs.
Notice of Opposition in counterpart EP 23194410.9, dated Sep. 29, 2025, 48-pgs.

* cited by examiner

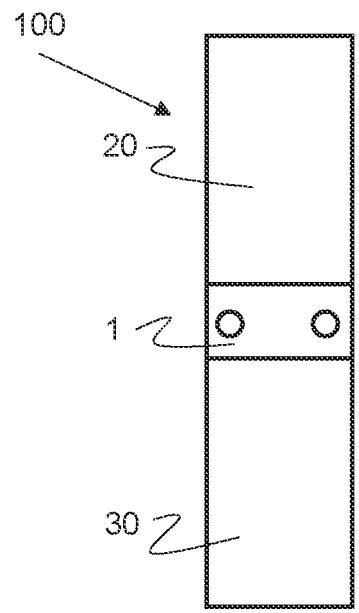
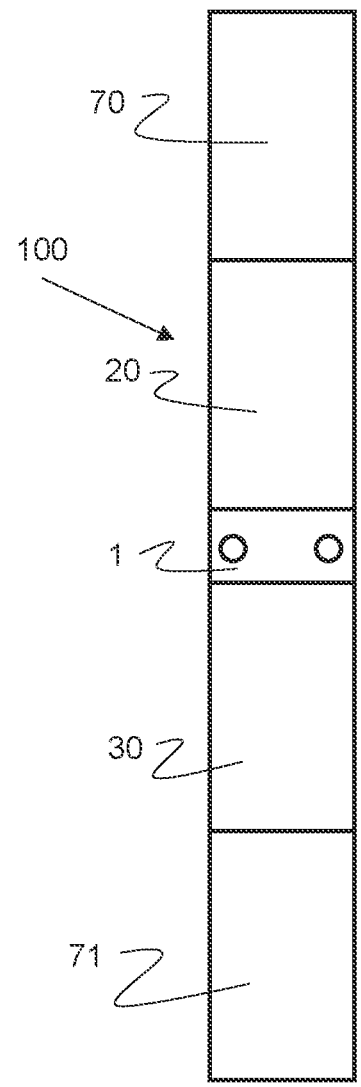
Fig. 4a
Fig. 4b

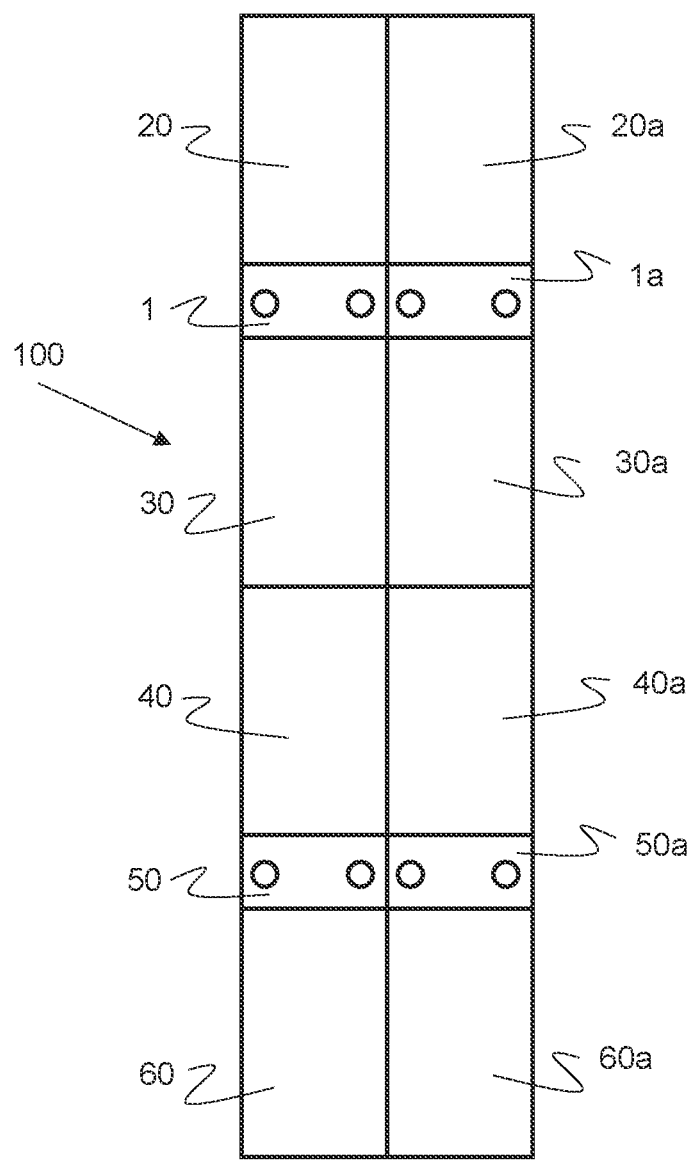
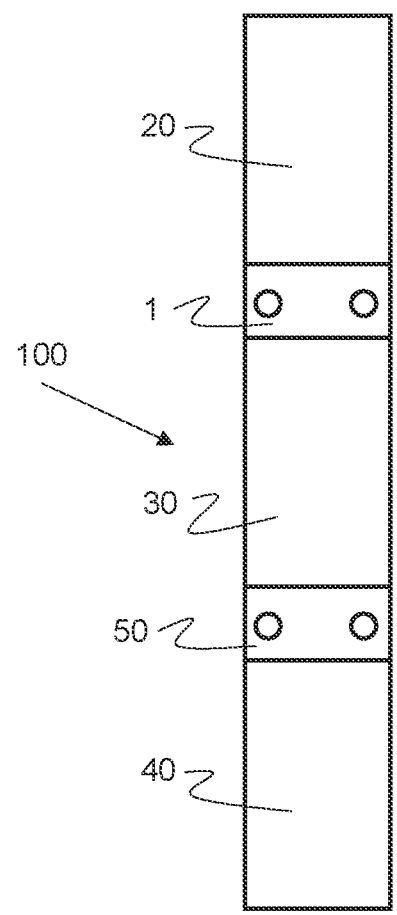
Fig. 4e
Fig. 4f

TRAILER STROKE EXTENDER AND HYDRAULIC TRAILER SYSTEM

CROSS-REFERENCE TO RELATED APPLICATIONS

This application claims the benefit under of 35 U.S.C. § 119 to Application No. NL2032977 filed Sep. 7, 2022 in The Netherlands.

FIELD OF THE DISCLOSURE

The present disclosure pertains to a trailer stroke extender for use in a hydraulic trailer system and to a hydraulic trailer system.

BACKGROUND OF THE DISCLOSURE

Hydraulic trailer systems are used for transporting heavy loads. Such hydraulic trailer systems generally comprise multiple hydraulic trailers, each hydraulic trailer having a loading bead and multiple wheels and/or multiple wheel pairs. The hydraulic trailers are often connected to each other. The wheels and/or wheel pairs of each hydraulic trailer are usually individually controllable (e.g., with respect to rotation speed and/or rotation angle about a vertical rotation axis) and often the loading bed of each hydraulic trailer can be moved in vertical direction over a vertical loading bed stroke.

A self-propelled modular trailer system (SPMT-system) is an example of a hydraulic trailer system.

In known hydraulic trailer systems, the vertical loading bed stroke is rather short, so the load can be lifted only over a small vertical distance.

SUMMARY OF THE DISCLOSURE

The present disclosure aims to provide an effective and efficient way to increase the vertical distance over which a load can be lifted by a hydraulic trailer system.

The object of the present disclosure is obtained by a trailer stroke extender for use in a hydraulic trailer system, which trailer stroke extender is adapted to be arranged between a spine beam connector of a first hydraulic trailer and a spine beam connector of a second hydraulic trailer,
the trailer stroke extender comprising:
  a cradle frame, which comprises a first cradle-to-beam connector and a second cradle-to-beam connector, wherein the first cradle-to-beam connector is adapted to be connected to the spine beam connector of the first hydraulic trailer and the second cradle-to-beam connector is adapted to be connected to the spine beam connector of the second hydraulic trailer, the first and the second cradle-to-beam connectors being spaced apart from each other in a longitudinal direction of the trailer stroke extender,
  a first hydraulic cylinder and a second hydraulic cylinder which are adapted to move a trailer load in a vertical direction relative to the cradle frame over a single stroke length, which first hydraulic cylinder and second hydraulic cylinder are arranged in the cradle frame at a distance from each other in a lateral direction of the trailer stroke extender.

The trailer stroke extender according to the present disclosure is suitable for, e.g., adapted for, use in a hydraulic trailer system. The hydraulic trailer system is or comprises for example a self-propelled modular trailer system (SPMT-system). The trailer stroke extender according to the present disclosure is adapted to be arranged between a spine beam connector of a first hydraulic trailer and a spine beam connector of a second hydraulic trailer. In hydraulic trailer systems, spine beam connectors are normally used to connect a spine beam of a hydraulic trailer to a spine beam of an adjacent hydraulic trailer.

The trailer stroke extender according to the present disclosure comprises a cradle frame. The cradle frame comprises a first cradle-to-beam connector and a second cradle-to-beam connector. The first cradle-to-beam connector is adapted to be connected to the spine beam connector of the first hydraulic trailer and the second cradle-to-beam connector is adapted to be connected to the spine beam connector of the second hydraulic trailer. The first and the second cradle-to-beam connectors are spaced apart from each other in a longitudinal direction of the trailer stroke extender.

Optionally, when the trailer stroke extender according to the present disclosure is connected to a spine beam connector of a first hydraulic trailer and a spine beam connector of a second hydraulic trailer, the longitudinal direction of the trailer stroke extender is parallel to, or for example coincides with, a longitudinal direction of a loading bed of the first hydraulic trailer and/or is parallel to, or for example coincides with, a longitudinal direction of a loading bed of the second hydraulic trailer.

The trailer stroke extender according to the present disclosure further comprises a first hydraulic cylinder and a second hydraulic cylinder. The first hydraulic cylinder and the second hydraulic cylinder are adapted to move a trailer load in a vertical direction relative to the cradle frame over a single stroke length. The single stroke length corresponds to the maximum stroke length of the first and second hydraulic cylinder or less. So, the first and the second hydraulic cylinder are adapted to move the trailer load relative to the cradle frame in a vertical direction over a distance with is equal to the maximum stroke length of the first and second hydraulic cylinder or less than that maximum stroke length. The first hydraulic cylinder and second hydraulic cylinder are arranged in the cradle frame at a distance from each other in a lateral direction of the first trailer stroke extender. Optionally, the first and the second hydraulic cylinder have equal maximum stroke lengths.

The first and second hydraulic cylinder being adapted to move the trailer load in a vertical direction relative to the cradle frame over a single stroke length (instead of jacking the trailer load over multiple stroke lengths) makes that the structure of the trailer stroke extender can be kept rather compact and straightforward while still being able to achieve a stroke extension that is sufficient for many situations.

The presence of two hydraulic cylinders (i.e., the first and the second hydraulic cylinder) provides increased lifting stability for the trailer load.

Optionally, when the trailer stroke extender according to the present disclosure is connected to a spine beam connector of a first hydraulic trailer and a spine beam connector of a second hydraulic trailer, the lateral direction of the trailer stroke extender is parallel to, or for example coincides with, a lateral direction of a loading bed of the first hydraulic trailer and/or is parallel to, or for example coincides with, a lateral direction of a loading bed of the second hydraulic trailer.

Optionally, the first hydraulic cylinder and the second hydraulic cylinder are arranged on opposite sides of the first cradle-to-beam connector. Optionally, the first hydraulic cylinder and the second hydraulic cylinder are arranged on opposite sides of the second cradle-to-beam connector. Optionally, the first hydraulic cylinder and the second hydraulic cylinder are arranged on opposite sides of the first cradle-to-beam connector and of the second cradle-to-beam connector. This increases the stability for the lifting of the trailer load.

In an embodiment of the trailer stroke extender according to the present disclosure, each of the first and the second hydraulic cylinder comprises a cylinder housing and a piston inside the cylinder housing. The cylinder housing of each of the first and the second hydraulic cylinder is moveable relative to the cradle frame and comprises a load support surface for supporting the trailer load and for moving the trailer load in a vertical direction over a single stroke length. In this embodiment, the cradle frame is adapted to support the cylinder housing of each of the first and the second hydraulic cylinder in a horizontal direction.

Optionally, in this embodiment, each of the first hydraulic cylinder and the second hydraulic cylinder comprises a piston rod which piston rod has a first end which is connected to the piston and a second end which is supported by the cradle frame.

The piston is optionally connected to a piston rod which extends to outside the cylinder housing. The piston and piston rod may be manufactured as separate parts which are joined together e.g., by welding, or the piston and piston rod may be manufactured as a single, integral part.

Optionally, in this embodiment, the cradle frame is provided with a first guide which guides the movement of the cylinder housing of the first hydraulic cylinder relative to the cradle frame, and with a second guide which guides the movement of the cylinder housing of the second hydraulic cylinder relative to the cradle frame. The first guide optionally is or comprises a plate having an opening, for example a cylindrical opening, through which the first cylinder housing extends and wherein the rim of the opening guides the movement of the cylinder housing of the first hydraulic cylinder, optionally with a lubricant, e.g., a solid lubricant being present between the rim of the opening and the cylinder housing of the first hydraulic cylinder. The second guide optionally is or comprises a plate having an opening, for example a cylindrical opening, through which the second cylinder housing extends and wherein the rim of the opening guides the movement of the cylinder housing of the second hydraulic cylinder, optionally with a lubricant, e.g., a solid lubricant being present between the rim of the opening and the cylinder housing of the second hydraulic cylinder.

In this embodiment, lateral forces that are exerted on the cylinder housing of the first hydraulic cylinder and/or of the second hydraulic cylinder are transferred to the cradle frame via the cylinder housing directly and not via the piston and/or piston rod. This reduces the risk of leakage of hydraulic fluid from the first hydraulic cylinder and the second hydraulic cylinder via the piston.

In an embodiment of the trailer stroke extender according to the present disclosure, the cradle frame further comprises a lateral cradle connector, which is adapted to connect the cradle frame to a cradle frame of another trailer stroke extender.

This embodiment allows multiple trailer stroke extenders to be connected to each other in lateral direction, which allows to transport wider loads.

Optionally, the loading beds of adjacent hydraulic trailers may be connected to each other in lateral directions as well.

In an embodiment of the trailer stroke extender according to the present disclosure, the cradle frame further comprises a first cradle-to-bed connector and a second cradle-to-bed connector. The first cradle-to-bed connector is adapted to be connected to a loading bed connector of a first hydraulic trailer and the second cradle-to-bed connector is adapted to be connected to a loading bed connector of a second hydraulic trailer.

The first and second cradle-to-bed connectors provide additional stability to the cradle frame when the cradle frame of the trailer stroke extender is connected to a loading bed connector of a first hydraulic trailer and to the loading bed connector of a second hydraulic trailer.

The present disclosure further pertains to a hydraulic trailer system, comprising a first trailer stroke extender, which first trailer stroke extender is a trailer stroke extender according to the present disclosure,
  wherein the hydraulic trailer system further comprises:
    a first hydraulic trailer and a second hydraulic trailer,
  wherein each hydraulic trailer comprises:
    a loading bed having an upper surface,
    a plurality of individually hydraulically controllable wheels and/or individually hydraulically controllable wheel pairs,
    a spine beam connector,
  wherein the first trailer stroke extender is arranged between the first hydraulic trailer and the second hydraulic trailer, and the first cradle-to-beam connector of the first trailer stroke extender is connected to the spine beam connector of the first hydraulic trailer and the second cradle-to-beam connector of the first trailer stroke extender is connected to the spine beam connector of the second hydraulic trailer.

Optionally, the first trailer stroke extender is a trailer stroke extender in accordance with one or more of the embodiments of the trailer stroke extender as described above and/or below.

Optionally, an additional hydraulic trailer is connected to the first hydraulic trailer on the side of the first hydraulic trailer opposite to the side where the spine beam connector of the first hydraulic trailer is connected to the first cradle-to-beam connector of the first trailer stroke extender. Optionally, a hydraulic trailer array comprising multiple additional hydraulic trailers is connected to the first hydraulic trailer on the side of the first hydraulic trailer opposite to the side where the spine beam connector of the first hydraulic trailer is connected to the first cradle-to-beam connector of the first trailer stroke extender.

Optionally, an additional hydraulic trailer is connected to the second hydraulic trailer on the side of the second hydraulic trailer opposite to the side where the spine beam connector of the second hydraulic trailer is connected to the second cradle-to-beam connector of the first trailer stroke extender. Optionally, a hydraulic trailer array comprising multiple additional hydraulic trailers is connected to the second hydraulic trailer on the side of the second hydraulic trailer opposite to the side where the spine beam connector of the second hydraulic trailer is connected to the second cradle-to-beam connector of the first trailer stroke extender.

In the hydraulic trailer system according to the present disclosure, a first trailer stroke extender is present. The first trailer stroke extender is a trailer stroke extender according to the present disclosure, for example a trailer stroke extender in accordance with one or more of the embodiments as described above and/or below.

The hydraulic trailer system according to the present disclosure further comprises a first hydraulic trailer and a second hydraulic trailer. The first hydraulic trailer comprises a loading bed having an upper surface, a plurality of individually hydraulically controllable wheels and/or individually hydraulically controllable wheel pairs and a spine beam connector. Likewise, the second hydraulic trailer comprises a loading bed having an upper surface, a plurality of individually hydraulically controllable wheels and/or individually hydraulically controllable wheel pairs and a spine beam connector.

Optionally, the loading bed of the first hydraulic trailer and/or the loading bed of the second hydraulic trailer is moveable in vertical direction over a loading bed stroke. The first trailer stroke extender permits a load to be lifted in vertical direction over an additional stroke length as compared to the trailer stroke length. The maximum additional stroke length is the stroke length of the first and the second cylinder of the first trailer stroke extender.

In the hydraulic trailer system according to the present disclosure, the first trailer stroke extender is arranged between the first hydraulic trailer and the second hydraulic trailer. The first cradle-to-beam connector of the first trailer stroke extender is connected to the spine beam connector of the first hydraulic trailer and the second cradle-to-beam connector of the first trailer stroke extender is connected to the spine beam connector of the second hydraulic trailer.

In an embodiment of the hydraulic trailer system according to the present disclosure, the hydraulic trailer system further comprises:
a second trailer stroke extender, which second trailer stroke extender is a trailer stroke extender according to the present disclosure,
a third hydraulic trailer and a fourth hydraulic trailer, wherein each hydraulic trailer comprises:
a loading bed having an upper surface,
a plurality of individually hydraulically controllable wheels and/or individually hydraulically controllable wheel pairs,
a spine beam connector, In this embodiment, the second trailer stroke extender is arranged between the third hydraulic trailer and the fourth hydraulic trailer. The first cradle-to-beam connector of the second trailer stroke extender is connected to the spine beam connector of the third hydraulic trailer and the second cradle-to-beam connector of the second trailer stroke extender is connected to the spine beam connector of the fourth hydraulic trailer.

So, in this embodiment, a first trailer array is present which is formed by the first hydraulic trailer, the first trailer stroke extender and the second hydraulic trailer. In addition, a second trailer array is present which is formed by the third hydraulic trailer, the second trailer stroke extender and the fourth hydraulic trailer.

Optionally, the third hydraulic trailer is of the same design as the first hydraulic trailer and/or the fourth hydraulic trailer is of the same design as the second hydraulic trailer.

Optionally, the design of the second trailer stroke extender is of the same design as the first trailer stroke extender.

Optionally, the second trailer stroke extender is a trailer stroke extender in accordance with one or more of the embodiments of the trailer stroke extender as described above and/or below.

Optionally, the loading bed of the third hydraulic trailer and/or the loading bed of the fourth hydraulic trailer is moveable in vertical direction over a loading bed stroke. The second trailer stroke extender permits a load to be lifted in vertical direction over an additional stroke length as compared to the trailer stroke length. The maximum additional stroke length is the stroke length of the first and the second cylinder of the second trailer stroke extender.

Optionally, the third hydraulic trailer is connected to the second hydraulic trailer.

Optionally, the second hydraulic trailer and the third hydraulic trailer are directly connected to each other. In this case, there is no further hydraulic trailer arranged between the second hydraulic trailer and the third hydraulic trailer. Optionally, the longitudinal axis of the second hydraulic trailer and the longitudinal axis of the third hydraulic trailer extend coaxially with each other.

For example, the second hydraulic trailer comprises a first spine beam connector and a second spine beam connector, and the first trailer stroke extender is connected to the first spine beam connector. Likewise, in this case, the third hydraulic trailer comprises a first spine beam connector and a second spine beam connector, and the second trailer stroke extender is connected to the first spine beam connector. In this case, for example, the second spine beam connector of the second hydraulic trailer and the second spine beam connector of the third hydraulic trailer are connected to each other.

Optionally, the third hydraulic trailer is indirectly connected to the second hydraulic trailer. In that case, for example at least one further hydraulic trailer is arranged between the second hydraulic trailer and the third hydraulic trailer. Optionally, the longitudinal axis of the second hydraulic trailer and the longitudinal axis of the third hydraulic trailer extend coaxially with each other.

For example, the second hydraulic trailer comprises a first spine beam connector and a second spine beam connector, and the first trailer stroke extender is connected to the first spine beam connector. Likewise, in this case, the third hydraulic trailer comprises a first spine beam connector and a second spine beam connector, and the second trailer stroke extender is connected to the first spine beam connector. In this case, for example, the second spine beam connector of the second hydraulic trailer is connected to a spine beam connector of an additional hydraulic trailer and the second spine beam connector of the third hydraulic trailer is connected to a further spine beam connector of that additional hydraulic trailer or to a spine beam connector of a different additional hydraulic trailer.

In an embodiment of the hydraulic trailer system according to the present disclosure, axles of adjacent wheels and/or adjacent wheel pairs of each of the first and second hydraulic trailer are spaced apart from each other in a longitudinal direction of the respective trailer over a wheel axle distance. In this embodiment, the distance between the first cradle-to-beam connector and the second cradle-to-beam connector of the first trailer stroke extender in a direction parallel to the longitudinal direction of at least one of the first or second hydraulic trailer is 75%-125% of the wheel axle distance, optionally equal to the wheel axle distance.

This allows an advantageous load distribution over the wheels and/or wheel pairs of the first and the second hydraulic trailer.

In an embodiment of the hydraulic trailer system according to the present disclosure, each of the first and the second hydraulic cylinder of the first trailer stroke extender has an extended state and a retracted state, and in the retracted state the load support surface of each of the first and the second hydraulic cylinder is arranged at the same level as or lower than the upper surface of the loading bed of the first and the second hydraulic trailers.

This embodiment allows the first and second cylinder to be fully retracted to a level at or below the respective loading beds of the first and second hydraulic trailers. This allows to obtain a flat loading bed area which comprises the upper surface of the loading bed of the first hydraulic trailer and the upper surface of the loading bed of the second hydraulic trailer.

In an embodiment of the hydraulic trailer system according to the present disclosure, the cradle frame of the first trailer stroke extender further comprises a first cradle-to-bed connector and a second cradle-to-bed connector. In this embodiment, each one of the first and second hydraulic trailer comprises a first loading bed connector on a first side of the loading bed and a second loading bed connector on a second side of the loading bed, wherein the second side is opposite to the first side. In this embodiment, the first cradle-to-bed connector of the first trailer stroke extender is connected to the second loading bed connector of the first hydraulic trailer and the second cradle-to-bed connector of the first trailer stroke extender is connected to the first loading bed connector of the second hydraulic trailer.

In this embodiment, the stability of the connection of the first trailer stroke extender to the first and second hydraulic trailer is increased.

In an embodiment of the hydraulic trailer system according to the present disclosure, the cradle frame of the first trailer stroke extender has a width in lateral direction and the loading bed of each of the first and second hydraulic trailer has a width in a direction parallel to the lateral direction of the cradle frame, and the width of the cradle frame in lateral direction is at least 50% of the width of the loading bed of the hydraulic trailers to which the respective cradle frame is attached in a direction parallel to the lateral direction of the cradle frame, and optionally is at least 80% of the width of the loading bed of the hydraulic trailers to which the respective cradle frame is attached in a direction parallel to the lateral direction of the cradle frame. For example, the width of the cradle frame in lateral direction is equal to the width of the loading bed of the first and/or second hydraulic trailer in a direction parallel to the lateral direction of the cradle frame.

This embodiment allows the first and second hydraulic cylinders to be spaced apart form each other in lateral direction over a distance which is equal to a significant portion of the width the loading bed of the first and/or second hydraulic trailer in a direction parallel to the lateral direction of the cradle frame. This increases the stability of the lifting of a trailer load by the first and second hydraulic cylinder of the first trailer stroke extender.

In an embodiment of the hydraulic trailer system according to the present disclosure, each of the first and second hydraulic trailer comprises a longitudinal spine beam which defines a maximum loading bed bending moment capacity of the loading bed of the respective hydraulic trailer, which longitudinal spine beam has a maximum beam bending moment capacity. In this embodiment, the cradle frame of the first trailer stroke extender has a maximum frame bending moment capacity which is a least 50%, optionally at least 80% and preferably at least 100% of the maximum beam bending moment capacity of the longitudinal spine beam of at least one of the hydraulic trailers to which the first trailer stroke extender is connected.

In this embodiment, the presence of the first trailer stroke extender has only a limited effect or even no effect of the load bearing capacity of the trailer array that comprises the first hydraulic trailer, the first trailer stroke extender and the second hydraulic trailer.

In an embodiment of the hydraulic trailer system according to the present disclosure, the hydraulic trailer system further comprises a first monopile support, which first monopile support is supported by the load support surfaces of the first and second hydraulic cylinders of the first trailer stroke extender.

Monopiles, e.g., as used for wind turbines, are an example of a load that is regularly transported using hydraulic trailers. Arranging a monopile support on the load support surfaces of the first and second hydraulic cylinders of the first trailer stroke extender allows to move the monopile in vertical direction relative to the loading beds of the first and second hydraulic trailer.

Optionally, the monopile support is supported by the load support surfaces of the first and second hydraulic cylinders of the first trailer stroke extender and by the load support surfaces of the first and second hydraulic cylinders of at least one further trailer stroke extender which is arranged in lateral direction adjacent to the first trailer stroke extender.

In an embodiment of the hydraulic trailer system according to the present disclosure, the spine beam connector of the second hydraulic trailer to which the first trailer stroke extender is connected is a first spine beam connector, and wherein the second hydraulic trailer further comprises a second spine beam connector,
wherein the hydraulic trailer system further comprises:
 a third hydraulic trailer,
wherein the third hydraulic trailer comprises:
a loading bed having an upper surface,
a plurality of individually hydraulically controllable wheels and/or individually hydraulically controllable wheel pairs,
a spine beam connector which is arranged on a first side of the third hydraulic trailer,
a second trailer stroke extender, comprising:
a cradle frame, which comprises a first cradle-to-beam connector and a second cradle-to-beam connector, wherein the first cradle-to-beam connector is adapted to be connected to the second spine beam connector of the second hydraulic trailer and the second cradle-to-beam connector is adapted to be connected to the spine beam connector of the third hydraulic trailer, the first and the second cradle-to-beam connectors being spaced apart from each other in a longitudinal direction of the second trailer stroke extender,
a first hydraulic cylinder and a second hydraulic cylinder which are adapted to move a trailer load in a vertical direction relative to the cradle frame over a single stroke length, which first hydraulic cylinder and second hydraulic cylinder are arranged in the cradle frame at a distance from each other in a lateral direction of the second trailer stroke extender, In this embodiment, the second trailer stroke extender is arranged between the second hydraulic trailer and the third hydraulic trailer, and the first cradle-to-beam connector of the second trailer stroke extender is connected to the second spine beam connector of the second hydraulic trailer and the second cradle-to-beam connector of the second trailer stroke extender is connected to the spine beam connector of the third hydraulic trailer.

In this embodiment, a trailer array is provided which comprises, in this order, the first hydraulic trailer, the first trailer stroke extender, the second hydraulic trailer, the second trailer stroke extender, and the third hydraulic trailer.

The present disclosure further pertains to a hydraulic trailer system, comprising a first trailer stroke extender, which first trailer stroke extender is a trailer stroke extender according to the present disclosure. Optionally, the first trailer stroke extender is a trailer stroke extender in accordance with one or more of the embodiments of the trailer stroke extender as described above and/or below.

BRIEF DESCRIPTION OF DRAWINGS

The present disclosure will be described in more detail below under reference to the drawing, in which in a non-limiting manner exemplary embodiments of the present disclosure will be shown. The drawing shows in:

FIGS. 4a-4f schematically show different arrangements of hydraulic trailers and trailer stroke extenders in accordance with embodiments of the present disclosure.

DETAILED DESCRIPTION OF THE DISCLOSURE

Figure 1:
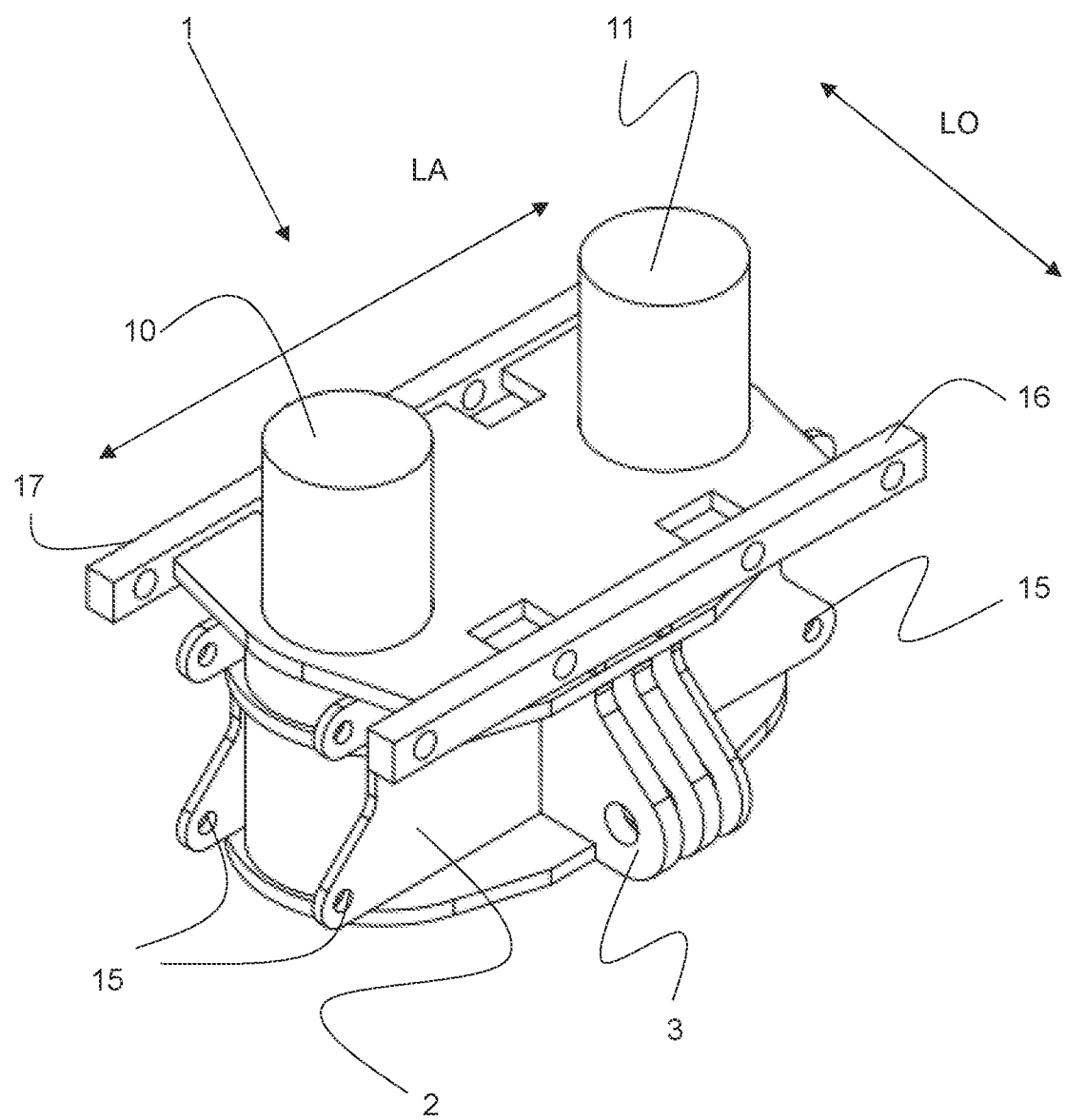
FIG. 1 schematically shows a first example of a trailer stroke extender according to the present disclosure.

FIG. 1 shows, schematically, a first example of a trailer stroke extender 1 according to the present disclosure.

The trailer stroke extender 1 is adapted for use in a hydraulic trailer system and is adapted to be arranged between a spine beam connector of a first hydraulic trailer and a spine beam connector of a second hydraulic trailer.

The trailer stroke extender 1 comprises a cradle frame 2. The cradle frame 2 comprises a first cradle-to-beam connector 3 and a second cradle-to-beam connector (not visible in the view of FIG. 1). The first cradle-to-beam connector 3 is adapted to be connected to the spine beam connector of the first hydraulic trailer and the second cradle-to-beam connector is adapted to be connected to the spine beam connector of the second hydraulic trailer. The first cradle-to-beam connector and the second cradle-to-beam connector are spaced apart from each other in a longitudinal direction LO of the trailer stroke extender 1.

Optionally, when the trailer stroke extender 1 according to FIG. 1 is connected to a spine beam connector of a first hydraulic trailer and a spine beam connector of a second hydraulic trailer, the longitudinal direction of the trailer stroke extender is parallel to, or for example coincides with, a longitudinal direction of a loading bed of the first hydraulic trailer and/or is parallel to, or for example coincides with, a longitudinal direction of a loading bed of the second hydraulic trailer.

The trailer stroke extender 1 further comprises a first hydraulic cylinder 10 and a second hydraulic cylinder 11 which are adapted to move a trailer load in a vertical direction relative to the cradle frame 2 over a single stroke length. The first hydraulic cylinder 10 and second hydraulic cylinder 11 are arranged in the cradle frame 2 at a distance from each other in a lateral direction LA of the trailer stroke extender 1.

The single stroke length corresponds to the maximum stroke length of the first and second hydraulic cylinder 10, 11 or less. So, the first and the second hydraulic cylinder 10, 11 are adapted to move the trailer load relative to the cradle frame 2 in a vertical direction over a distance with is equal to the maximum stroke length of the first and second hydraulic cylinder 10, 11 or less than that maximum stroke length. Optionally, the first and the second hydraulic cylinder 10, 11 have equal maximum stroke lengths.

The first and second hydraulic cylinder 10, 11 being adapted to move the trailer load in a vertical direction relative to the cradle frame 2 over a single stroke length (instead of jacking the trailer load over multiple stroke lengths) makes that the structure of the trailer stroke extender can be kept rather compact and straightforward while still being able to achieve a stroke extension that is sufficient for many situations.

The trailer stroke extender 1 according to FIG. 1 is suitable for, e.g., adapted for, use in a hydraulic trailer system. The hydraulic trailer system is or comprises for example a self-propelled modular trailer system (SPMT-system). The trailer stroke extender 1 according to FIG. 1 is adapted to be arranged between a spine beam connector of a first hydraulic trailer and a spine beam connector of a second hydraulic trailer. In hydraulic trailer systems, spine beam connectors are normally used to connect a spine beam of a hydraulic trailer to a spine beam of an adjacent hydraulic trailer.

Optionally, when the trailer stroke extender according to FIG. 1 is connected to a spine beam connector of a first hydraulic trailer and a spine beam connector of a second hydraulic trailer, the lateral direction LA of the trailer stroke extender is parallel to, or for example coincides with, a lateral direction of a loading bed of the first hydraulic trailer and/or is parallel to, or for example coincides with, a lateral direction of a loading bed of the second hydraulic trailer.

In the embodiment of FIG. 1, the first hydraulic cylinder 10 and the second hydraulic cylinder 12 are arranged on opposite sides of the first cradle-to-beam connector 3 and of the second cradle-to-beam connector.

In the embodiment of FIG. 1, the cradle frame 2 further comprises a lateral cradle 15 connector, which is adapted to connect the cradle frame 2 to a cradle frame of another trailer stroke extender. This allows multiple trailer stroke extenders to be connected to each other in lateral direction, which allows to transport wider loads. Optionally, the loading beds of adjacent hydraulic trailers may be connected to each other in lateral directions as well.

In the embodiment of FIG. 1, the cradle frame 2 further comprises a first cradle-to-bed connector 16 and a second cradle-to-bed connector 17. The first cradle-to-bed connector 16 is adapted to be connected to a loading bed connector of a first hydraulic trailer and the second cradle-to-bed connector 17 is adapted to be connected to a loading bed connector of a second hydraulic trailer.

Figure 2:
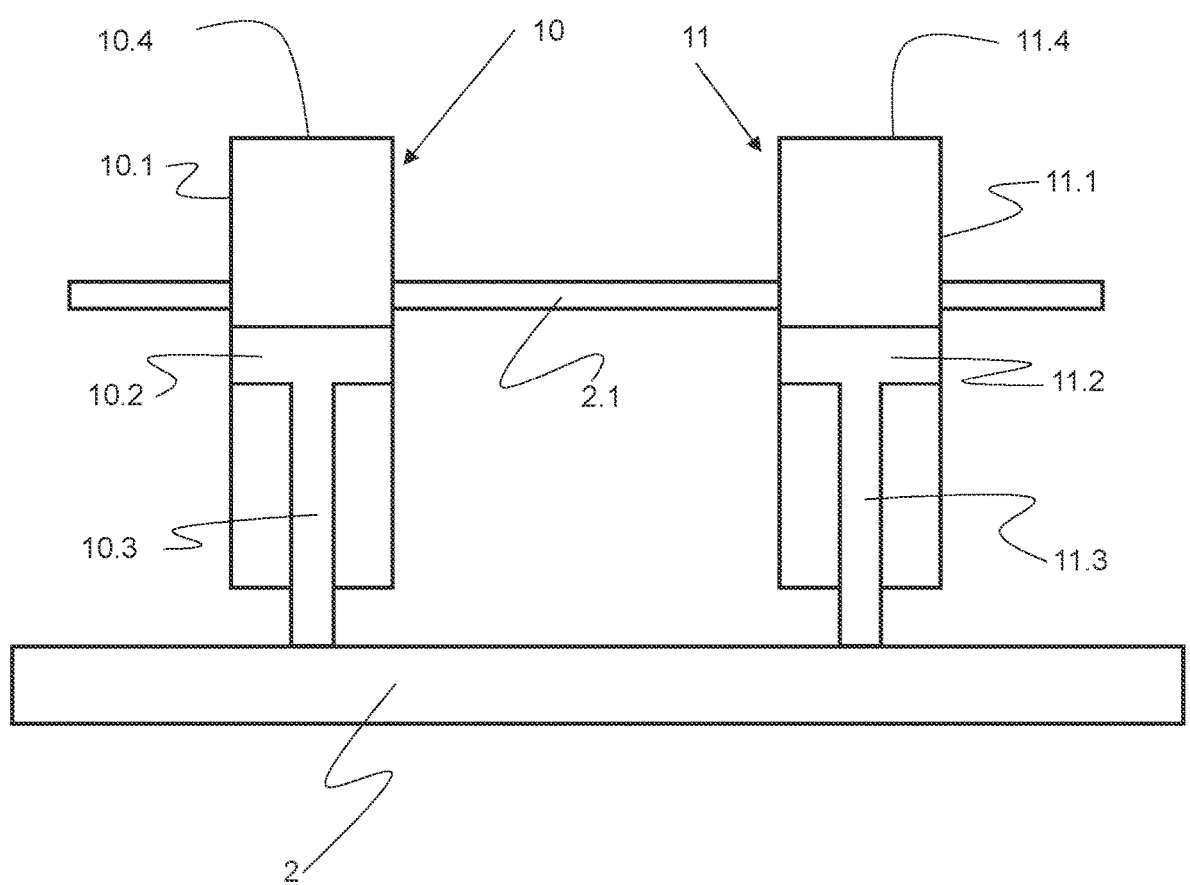
FIG. 2 schematically shows an example of the first and second hydraulic cylinders as they can be arranged in the trailer stroke extender according to the present disclosure.

FIG. 2 shows, schematically, an example of the first and second hydraulic cylinders 10, 11 as they can be arranged in the trailer stroke extender according to the present disclosure.

In the example of FIG. 2, each of the first and the second hydraulic cylinder 10, 11 comprises a cylinder housing 10.1, 11.1 and a piston 10.2, 11.2 inside the cylinder housing 10.1, 11.2. The cylinder housing 10.1, 11.1 of each of the first and the second hydraulic cylinder 10, 11 is moveable relative to the cradle frame 2 and comprises a load support surface 10.4, 11.4 for supporting the trailer load and for moving the trailer load in a vertical direction over a single stroke length. In this example, the cradle frame 2 comprises a plate 2.1 which is adapted to support the cylinder housing 10.1, 11.1 of each of the first and the second hydraulic cylinder 10, 11 in a horizontal direction.

In this example, each of the first hydraulic cylinder 10 and the second hydraulic cylinder 11 comprises a piston rod 10.3, 11.3. Each piston rod 10.3, 11.3 has a first end which is connected to the piston 10.2, 11.2 and a second end which is supported by the cradle frame 2.

The piston rod 10.3, 11.3 extends to outside the cylinder housing 10.1, 11.1. The piston 10.2, 11.2 and piston rod 10.3, 11.3 may be manufactured as separate parts which are joined together (e.g., by welding), or the piston 10.2, 11.2 and piston rod 10.3, 11.3 may be manufactured as a single, integral part.

In the example of FIG. 2, the cradle frame 2 is provided with a first guide which guides the movement of the cylinder housing 10.1 of the first hydraulic cylinder 10 relative to the cradle frame 2, and with a second guide which guides the movement of the cylinder housing 11.1 of the second hydraulic cylinder 11 relative to the cradle frame 2. In this example, the first guide is part of plate 2.1, which has a first opening, for example a cylindrical opening, through which the first cylinder housing 10.1 extends and wherein the rim of the opening guides the movement of the cylinder housing 10.1 of the first hydraulic cylinder 10, optionally with a lubricant, e.g., a solid lubricant being present between the rim of the opening and the cylinder housing 10.1 of the first hydraulic cylinder. The second guide is part of the same plate 2.1 which further has a second opening, for example a cylindrical opening, through which the second cylinder housing 11.1 extends and wherein the rim of the opening guides the movement of the cylinder housing 11.1 of the second hydraulic cylinder 11, optionally with a lubricant, e.g., a solid lubricant being present between the rim of the opening and the cylinder housing 11.1 of the second hydraulic cylinder 11.

Figure 3:
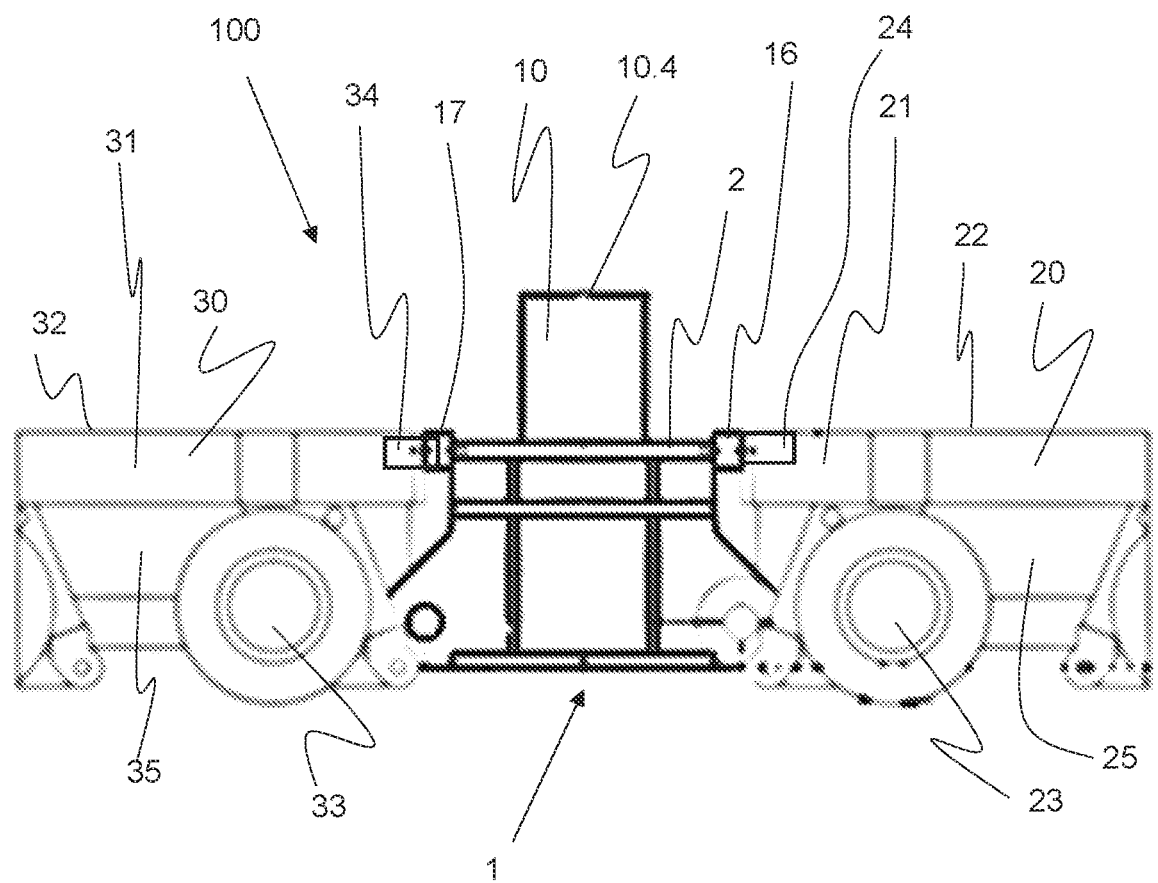
FIG. 3 schematically shows a part of a first embodiment of a hydraulic trailer system according to the present disclosure.

FIG. 3 schematically shows a part of a first embodiment of a hydraulic trailer system 100 according to the present disclosure.

In the hydraulic trailer system 100 according to FIG. 3, a first trailer stroke extender 1 is present. The first trailer stroke extender 1 is a trailer stroke extender according to the present disclosure, for example a trailer stroke extender in accordance with one or more of the embodiments as described above and/or below. For example, the trailer stroke extender of the embodiment of FIG. 3 is a trailer stroke extender according to FIG. 1 and FIG. 2.

The hydraulic trailer system 100 according to FIG. 3 further comprises a first hydraulic trailer 20 and a second hydraulic trailer 30. The first hydraulic trailer 20 comprises a loading bed 21 having an upper surface 22, a plurality of individually hydraulically controllable wheels and/or individually hydraulically controllable wheel pairs 23 and a spine beam connector. Likewise, the second hydraulic trailer 30 comprises a loading bed 31 having an upper surface 32, a plurality of individually hydraulically controllable wheels and/or individually hydraulically controllable wheel pairs 33 and a spine beam connector. The first and second hydraulic trailer 20, 30 are only partly shown in FIG. 3.

Optionally, the loading bed of the first hydraulic trailer 20 and/or the loading bed of the second hydraulic trailer 30 is moveable in vertical direction over a loading bed stroke. The first trailer stroke extender 1 permits a load to be lifted in vertical direction over an additional stroke length as compared to the trailer stroke length. The maximum additional stroke length is the stroke length of the first and the second cylinder of the first trailer stroke extender.

In the hydraulic trailer system of FIG. 3, the first trailer stroke extender 1 is arranged between the first hydraulic trailer 20 and the second hydraulic trailer 30 The first cradle-to-beam connector of the first trailer stroke extender 1 is connected to the spine beam connector of the first hydraulic trailer 20 and the second cradle-to-beam connector of the first trailer stroke extender 1 is connected to the spine beam connector of the second hydraulic trailer 30.

Optionally, an additional hydraulic trailer is connected to the first hydraulic trailer 20 on the side of the first hydraulic trailer opposite to the side where the spine beam connector of the first hydraulic trailer 20 is connected to the first cradle-to-beam connector of the first trailer stroke extender 1. Optionally, a hydraulic trailer array comprising multiple additional hydraulic trailers is connected to the first hydraulic trailer 20 on the side of the first hydraulic trailer 20 opposite to the side where the spine beam connector of the first hydraulic trailer 20 is connected to the first cradle-to-beam connector of the first trailer stroke extender 1.

Optionally, an additional hydraulic trailer is connected to the second hydraulic trailer 30 on the side of the second hydraulic trailer 30 opposite to the side where the spine beam connector of the second hydraulic trailer 30 is connected to the second cradle-to-beam connector of the first trailer stroke extender 1. Optionally, a hydraulic trailer array comprising multiple additional hydraulic trailers is connected to the second hydraulic trailer 30 on the side of the second hydraulic trailer 30 opposite to the side where the spine beam connector of the second hydraulic trailer 30 is connected to the second cradle-to-beam connector of the first trailer stroke extender 1.

Optionally, in the embodiment of FIG. 3, axles of adjacent wheels and/or adjacent wheel pairs of each of the first and second hydraulic trailer 20, 30 are spaced apart from each other in a longitudinal direction of the respective trailer over a wheel axle distance. The distance between the first cradle-to-beam connector and the second cradle-to-beam connector of the first trailer stroke extender 1 in a direction parallel to the longitudinal direction of at least one of the first or second hydraulic trailer is 75%-125% of the wheel axle distance, optionally equal to the wheel axle distance.

Optionally, in the embodiment of FIG. 3, each of the first and the second hydraulic cylinder 10, 11 of the first trailer stroke extender 1 has an extended state and a retracted state, and in the retracted state the load support surface 10.4, 11.4 of each of the first and the second hydraulic cylinder 10, 11 is arranged at the same level as or lower than the upper surface 22, 32 of the loading bed 21, 31 of the first and the second hydraulic trailers 20, 30.

Optionally, in the embodiment of FIG. 3, the cradle frame 2 of the first trailer stroke extender 1 further comprises a first cradle-to-bed connector 16 and a second cradle-to-bed connector 17. In this embodiment, each one of the first and second hydraulic trailer 20, 30 comprises a first loading bed connector on a first side of the loading bed 21, 31 and a second loading bed connector on a second side of the loading bed 21, 31, wherein the second side is opposite to the first side. Optionally, this embodiment, the first cradle-to-bed connector 16 of the first trailer stroke extender 1 is connected to the second loading bed connector 24 of the first hydraulic trailer 20 and the second cradle-to-bed connector 17 of the first trailer stroke extender 1 is connected to the first loading bed connector 34 of the second hydraulic trailer 30.

Optionally, in the embodiment of FIG. 3, each of the first and second hydraulic trailer 20, 30 comprises a longitudinal spine beam 25, 35 which defines a maximum loading bed bending moment capacity of the loading bed 21, 31 of the respective hydraulic trailer 20, 30, which longitudinal spine beam 25, 35 has a maximum beam bending moment capacity. Optionally, the cradle frame 2 of the first trailer stroke extender 1 has a maximum frame bending moment capacity which is a least 50%, optionally at least 80% and preferably at least 100% of the maximum beam bending moment capacity of the longitudinal spine beam 25, 35 of at least one of the hydraulic trailers 20, 30 to which the first trailer stroke extender 1 is connected.

Optionally, in the embodiment of FIG. 3, the cradle frame 2 of the first trailer stroke extender 1 has a width in lateral direction LA and the loading bed 21, 31 of each of the first and second hydraulic trailer 20, 30 has a width in a direction parallel to the lateral direction LA of the cradle frame 2, and the width of the cradle frame 2 in lateral direction LA is at least 50% of the width of the loading bed 21, 31 of the hydraulic trailers 20, 30 to which the respective cradle frame 2 is attached in a direction parallel to the lateral direction LA of the cradle frame 2, and optionally is at least 80% of the width of the loading bed 21, 31 of the hydraulic trailers 20, 30 to which the respective cradle frame 2 is attached in a direction parallel to the lateral direction LA of the cradle frame. For example, the width of the cradle frame 2 in lateral direction is equal to the width of the loading bed 21, 31 of the first and/or second hydraulic trailer 20,30 in a direction parallel to the lateral direction LA of the cradle frame 2.

FIGS. 4a-4f schematically show different arrangements of hydraulic trailers and trailer stroke extenders in accordance with embodiments of the present disclosure.

In the arrangements shown in FIGS. 4a-4f, the hydraulic trailers and trailer stroke extenders are for example hydraulic trailers and trailer stroke extenders according to the present disclosure, in particular according to any of the embodiments or combination of embodiments as described above and/or below.

FIG. 4a shows a first example of an arrangement of hydraulic trailers 20, 30 and a trailer stroke extender 1 in an embodiment of a hydraulic trailer system according to the present disclosure. In this first example, a first trailer stroke extender 1 is arranged between a first hydraulic trailer 20 and a second hydraulic trailer 30. This arrangement can be uses as such, or as a building block or module in a larger hydraulic trailer system, in which the arrangement as shown in FIG. 4a is combined with one or more further hydraulic trailers and/or one or more further trailer stroke extenders. Optionally, such a larger hydraulic system comprises multiple arrangements of two hydraulic trailers with a trailer stroke extender between them in accordance with FIG. 4a.

FIG. 4b shows a second example of an arrangement of hydraulic trailers 20, 30, 70, 71 and a trailer stroke extender 1 in an embodiment of a hydraulic trailer system according to the present disclosure.

The arrangement of FIG. 4b is similar to the arrangement of FIG. 4a. However, in the arrangement of FIG. 4b, an additional hydraulic trailer 70 is connected to the first hydraulic trailer 20 on the side of the first hydraulic trailer opposite to the side where the spine beam connector of the first hydraulic trailer 20 is connected to the first cradle-to-beam connector of the first trailer stroke extender 1.

In addition, a further additional hydraulic trailer 71 is connected to the second hydraulic trailer 30 on the side of the second hydraulic trailer 30 opposite to the side where the spine beam connector of the second hydraulic trailer 30 is connected to the second cradle-to-beam connector of the first trailer stroke extender 1.

Figure 4C:
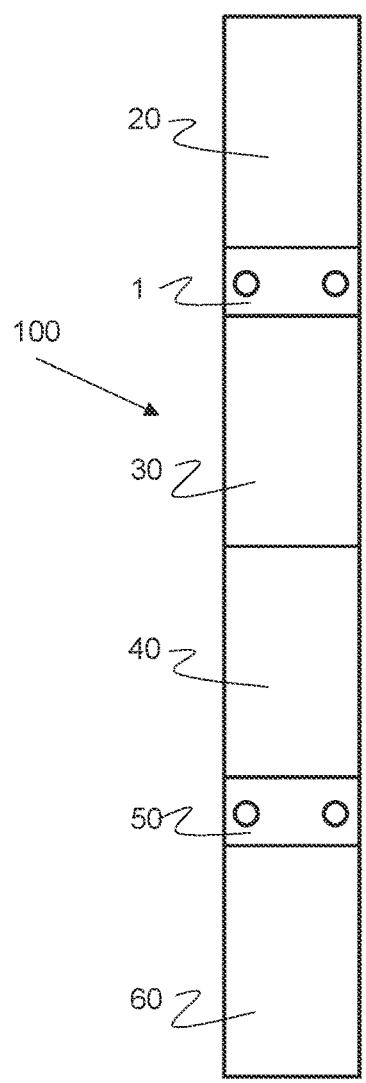

FIG. 4c shows a third example of an arrangement of hydraulic trailers 20, 30, 40, 60 and trailer stroke extenders 1, 50 in an embodiment of a hydraulic trailer system according to the present disclosure.

The arrangement of FIG. 4c comprises the arrangement of FIG. 4a and a similar arrangement with a third hydraulic trailer 40, a second trailer stroke extender 50 and a fourth hydraulic trailer 60 which is connected to the arrangement as shown in FIG. 4a.

So, apart from the arrangement of FIG. 4a, which is for example in accordance with the embodiment of FIG. 3, the arrangement of FIG. 4c further comprises:
  a second trailer stroke extender 50, which second trailer stroke extender 50 is a trailer stroke extender according to the present disclosure, e.g., a trailer stroke extender in accordance with one of the embodiments as described above or below or a combination of embodiments as described above or below,
  a third hydraulic trailer 40 and a fourth hydraulic trailer 60,
  wherein each hydraulic trailer 40, 60 comprises:
  a loading bed having an upper surface,
  a plurality of individually hydraulically controllable wheels and/or individually hydraulically controllable wheel pairs,
  a spine beam connector, In the arrangement of FIG. 4c, the second trailer stroke extender 50 is arranged between the third hydraulic trailer 40 and the fourth hydraulic trailer 60. The first cradle-to-beam connector of the second trailer stroke extender 50 is connected to the spine beam connector of the third hydraulic trailer 40 and the second cradle-to-beam connector of the second trailer stroke extender 50 is connected to the spine beam connector of the fourth hydraulic trailer 60.

So, in this embodiment, a first trailer array is present which is formed by the first hydraulic trailer 20, the first trailer stroke extender 1 and the second hydraulic trailer 30. In addition, a second trailer array is present which is formed by the third hydraulic trailer 40, the second trailer stroke extender 50 and the fourth hydraulic trailer 60.

Optionally, the third hydraulic trailer 40 is of the same design as the first hydraulic trailer 20 and/or the fourth hydraulic trailer 60 is of the same design as the second hydraulic trailer 30.

Optionally, the design of the second trailer stroke extender 50 is of the same design as the first trailer stroke extender 1.

Optionally, the second trailer stroke extender 50 is a trailer stroke extender in accordance with one or more of the embodiments of the trailer stroke extender as described above and/or below.

Optionally, the loading bed of the third hydraulic trailer 40 and/or the loading bed of the fourth hydraulic trailer 60 is moveable in vertical direction over a loading bed stroke. The second trailer stroke extender makes 50 that a load can be lifted in vertical direction over an additional stroke length as compared to the trailer stroke length. The maximum additional stroke length is the stroke length of the first and the second cylinder of the second trailer stroke extender 50.

In the arrangement of FIG. 4c, the third hydraulic trailer 40 is connected to the second hydraulic trailer 30.

In the arrangement of FIG. 4c, the second hydraulic trailer 30 and the third hydraulic trailer 40 are directly connected to each other. In this case, there is no further hydraulic trailer arranged between the second hydraulic trailer 30 and the third hydraulic trailer 40. In the arrangement of FIG. 4c, the longitudinal axis of the second hydraulic trailer 30 and the longitudinal axis of the third hydraulic trailer 40 extend coaxially with each other.

For example, the second hydraulic trailer 30 comprises a first spine beam connector and a second spine beam connector, and the first trailer stroke extender 1 is connected to the first spine beam connector. Likewise, in this case, the third hydraulic trailer 40 comprises a first spine beam connector and a second spine beam connector, and the second trailer stroke extender 50 is connected to the first spine beam connector. In this case, for example, the second spine beam connector of the second hydraulic trailer 30 and the second spine beam connector of the third hydraulic trailer 40 are connected to each other.

Figure 4D:
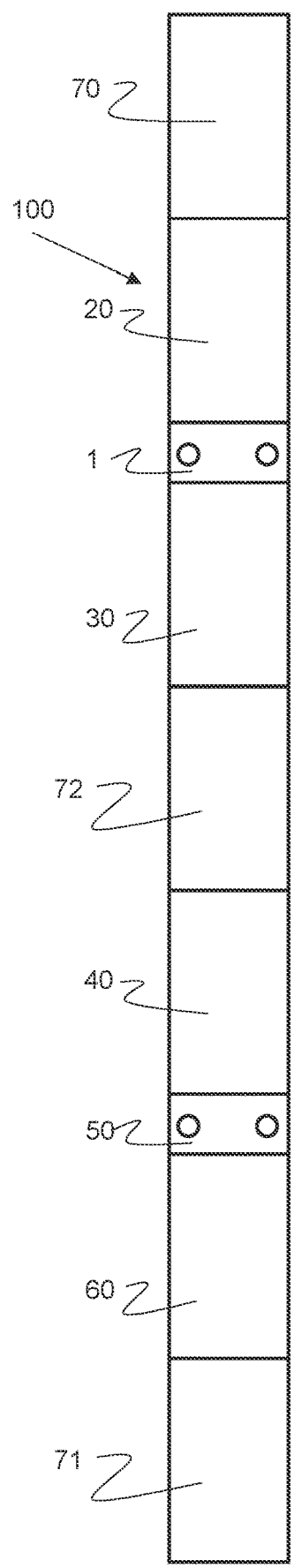

FIG. 4d shows a fourth example of an arrangement of hydraulic trailers 20, 30, 40, 60, 70, 71, 72 and trailer stroke extenders 1, 50 in an embodiment of a hydraulic trailer system according to the present disclosure.

The arrangement of FIG. 4d is similar to the arrangement of FIG. 4c, however, additional hydraulic trailers 70, 71, 72 have been added to the arrangement as shown in FIG. 4c.

In the arrangement of FIG. 4d, the third hydraulic trailer 40 is indirectly connected to the second hydraulic trailer 30. For example at least one further hydraulic trailer 72 is arranged between the second hydraulic trailer 30 and the third hydraulic trailer 40. In the arrangement of FIG. 4d, the longitudinal axis of the second hydraulic trailer 30 and the longitudinal axis of the third hydraulic trailer 40 extend coaxially with each other.

For example, the second hydraulic trailer 30 comprises a first spine beam connector and a second spine beam connector, and the first trailer stroke extender 1 is connected to the first spine beam connector. Likewise, in this case, the third hydraulic trailer 40 comprises a first spine beam connector and a second spine beam connector, and the second trailer stroke extender 50 is connected to the first spine beam connector. In this case, for example, the second spine beam connector of the second hydraulic trailer 30 is connected to a spine beam connector of an additional hydraulic trailer 72 and the second spine beam connector of the third hydraulic trailer 40 is connected to a further spine beam connector of that additional hydraulic trailer 72.

In addition, in the arrangement of FIG. 4d, an additional hydraulic trailer 70 is connected to the first hydraulic trailer 20 on the side of the first hydraulic trailer opposite to the side where the spine beam connector of the first hydraulic trailer 20 is connected to the first cradle-to-beam connector of the first trailer stroke extender 1.

Furthermore, a further additional hydraulic trailer 71 is connected to the second hydraulic trailer 30 on the side of the second hydraulic trailer 30 opposite to the side where the spine beam connector of the second hydraulic trailer 30 is connected to the second cradle-to-beam connector of the first trailer stroke extender 1.

FIG. 4e shows a fifth example of an arrangement of hydraulic trailers 20, 30, 40, 60, 20a, 30a, 40a, 60a and trailer stroke extenders 1, 50, 1a, 50a in an embodiment of a hydraulic trailer system according to the present disclosure.

The arrangement of FIG. 4e comprises two trailer arrays which are connected to each other laterally. Each of the two trailer arrays is an arrangement in accordance with FIG. 4c. One of the trailer arrays is formed by the first hydraulic trailer 20, the first stroke extender 1, the second hydraulic trailer 40, the third hydraulic trailer 40, the second trailer stroke extender 50 and the fourth hydraulic trailer 60. The other one of the trailer arrays is formed by hydraulic trailer 20a as the first hydraulic trailer, trailer stroke extender 1a as the first trailer stroke extender, hydraulic trailer 30a as the second hydraulic trailer, hydraulic trailer 40a as the third hydraulic trailer, trailer stroke extender 50a as the second trailer stroke extender and hydraulic trailer 40a as the fourth hydraulic trailer.

FIG. 4f shows a sixth example of an arrangement of hydraulic trailers 20, 30, 40, and trailer stroke extenders 1, 50 in an embodiment of a hydraulic trailer system according to the present disclosure.

In the arrangement of FIG. 4f, the spine beam connector of the second hydraulic trailer 30 to which the first trailer stroke extender 1 is connected is a first spine beam connector, and the second hydraulic trailer 30 further comprises a second spine beam connector, In addition to the arrangement as shown in FIG. 4a, the arrangement of FIG. 4f, the hydraulic trailer system further comprises:

a third hydraulic trailer 40,
wherein the third hydraulic trailer 40 comprises:
a loading bed having an upper surface,
a plurality of individually hydraulically controllable wheels and/or individually hydraulically controllable wheel pairs,
a spine beam connector which is arranged on a first side of the third hydraulic trailer,
a second trailer stroke extender 50, comprising:
a cradle frame, which comprises a first cradle-to-beam connector and a second cradle-to-beam connector, wherein the first cradle-to-beam connector is adapted to be connected to the second spine beam connector of the second hydraulic trailer and the second cradle-to-beam connector is adapted to be connected to the spine beam connector of the third hydraulic trailer, the first and the second cradle-to-beam connectors being spaced apart from each other in a longitudinal direction of the second trailer stroke extender,
a first hydraulic cylinder and a second hydraulic cylinder which are adapted to move a trailer load in a vertical direction relative to the cradle frame over a single stroke length, which first hydraulic cylinder and second hydraulic cylinder are arranged in the cradle frame at a distance from each other in a lateral direction of the second trailer stroke extender, In the arrangement of FIG. 4f, the second trailer stroke extender 50 is arranged between the second hydraulic trailer 30 and the third hydraulic trailer 40, and the first cradle-to-beam connector of the second trailer stroke extender 50 is connected to the second spine beam connector of the second hydraulic trailer 30 and the second cradle-to-beam connector of the second trailer stroke extender 50 is connected to the spine beam connector of the third hydraulic trailer 40.

In this arrangement, a trailer array is provided which comprises, in this order, the first hydraulic trailer 20, the first trailer stroke extender 1, the second hydraulic trailer 40, the second trailer stroke extender 50, and the third hydraulic trailer 40.

Figure 5:
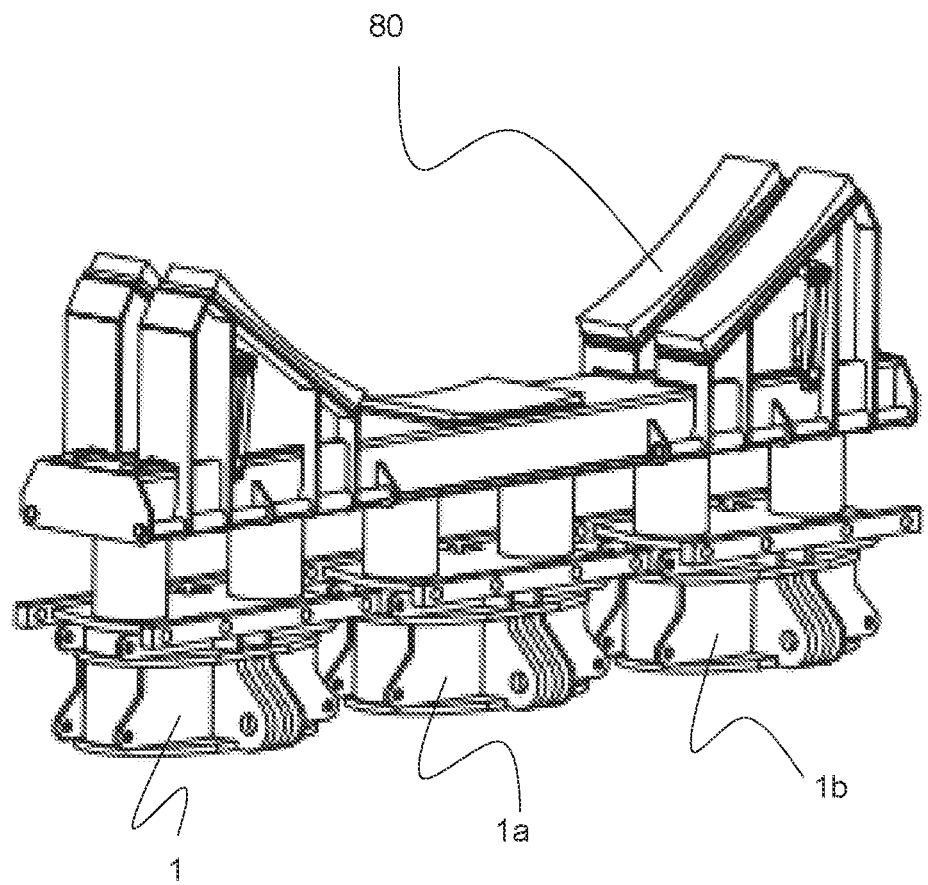
FIG. 5 schematically shows an example of a monopile support 80 which can be used in a hydraulic trailer system according to the present disclosure.

FIG. 5 shows schematically an example of a monopile support 80 which can be used in a hydraulic trailer system according to the present disclosure.

The monopile support 80 is supported by the load support surfaces of the first and second hydraulic cylinders of a first trailer stroke extender 1, the load support surfaces of the first and second hydraulic cylinders of a second trailer stroke extender 1a and the load support surfaces of the first and second hydraulic cylinders of a third trailer stroke extender 1b. The first, second and third trailer stroke extenders 1, 1a, 1b are arranged adjacent to each other in lateral direction.

Optionally, the first trailer stroke extender 1 is connected to the second trailer stroke extender 1a and the third trailer stroke extender 1b is connected to the second trailer stroke extender 1a.

Optionally, the first trailer stroke extender 1 comprises a first lateral cradle connector, the second trailer stroke extender 1*a* comprises a first lateral cradle connector and a second lateral cradle connector and the third trailer stroke extender 1*b* comprises a first lateral cradle connector, and the first lateral cradle connector of the first trailer stroke extender 1 is connected to the first lateral cradle connector of the second trailer stroke extender 1*a*, and the first lateral cradle connector of the third trailer stroke extender 1*b* is connected to the second lateral cradle connector of the second trailer stroke extender 1*a*.

Monopiles, e.g., as used for wind turbines, are an example of a load that is regularly transported using hydraulic trailers. Arranging a monopile support on the load support surfaces of the first and second hydraulic cylinders of the first trailer stroke extender allows to move the monopile in vertical direction relative to the loading beds of the first and second hydraulic trailer.

What is claimed is:

1. A trailer stroke extender for use in a hydraulic trailer system, wherein the trailer stroke extender is adapted to be arranged between a spine beam connector of a first hydraulic trailer and a spine beam connector of a second hydraulic trailer, the trailer stroke extender comprising:
    a cradle frame comprising a first cradle-to-beam connector and a second cradle-to-beam connector, wherein the first cradle-to-beam connector is adapted to be connected to the spine beam connector of the first hydraulic trailer and the second cradle-to-beam connector is adapted to be connected to the spine beam connector of the second hydraulic trailer, the first and the second cradle-to-beam connectors being spaced apart from each other in a longitudinal direction of the trailer stroke extender; and
    a first hydraulic cylinder and a second hydraulic cylinder being adapted to move a trailer load in a vertical direction relative to the cradle frame over a single stroke length, wherein the first hydraulic cylinder and the second hydraulic cylinder are arranged in the cradle frame at a distance from each other in a lateral direction of the trailer stroke extender.

2. The trailer stroke extender according to claim 1,
    wherein each of the first and the second hydraulic cylinder comprises a cylinder housing and a piston inside the cylinder housing;
    wherein the cylinder housing of each of the first and the second hydraulic cylinders is moveable relative to the cradle frame and comprises a load support surface for supporting the trailer load and for moving the trailer load in the vertical direction over the single stroke length; and
    wherein the cradle frame is adapted to support the cylinder housing of each of the first and the second hydraulic cylinders in a horizontal direction.

3. Trailer The trailer stroke extender according to claim 2, wherein each of the first hydraulic cylinder and the second hydraulic cylinder comprises a piston rod, wherein the piston rod has a first end which is connected to the piston and a second end, and wherein the second end is supported by the cradle frame.

4. The trailer stroke extender according to claim 1, wherein the cradle frame further comprises a lateral cradle connector being adapted to connect the cradle frame to a cradle frame of another trailer stroke extender.

5. The trailer stroke extender according to claim 1, wherein the cradle frame further comprises a first cradle-to-bed connector and a second cradle-to-bed connector, wherein the first cradle-to-bed connector is adapted to be connected to a loading bed connector of a first hydraulic trailer and the second cradle-to-bed connector is adapted to be connected to a loading bed connector of a second hydraulic trailer.

6. A hydraulic trailer system comprising a first trailer stroke extender according to claim 1, wherein the hydraulic trailer system further comprises:
    a first hydraulic trailer and a second hydraulic trailer, wherein each of the first and second hydraulic trailers comprises:
        a loading bed having an upper surface,
        a plurality of individually hydraulically controllable wheels and/or individually hydraulically controllable wheel pairs, and
        a spine beam connector;
    wherein the first trailer stroke extender is arranged between the first hydraulic trailer and the second hydraulic trailer; and
    wherein the first cradle-to-beam connector of the first trailer stroke extender is connected to the spine beam connector of the first hydraulic trailer and the second cradle-to-beam connector of the first trailer stroke extender is connected to the spine beam connector of the second hydraulic trailer.

7. The hydraulic trailer system according to claim 6,
    wherein the hydraulic trailer system further comprises:
        a second trailer stroke extender according to claim 1, and
        a third hydraulic trailer and a fourth hydraulic trailer;
    wherein each of the third and fourth hydraulic trailers comprises:
        a loading bed having an upper surface,
        a plurality of individually hydraulically controllable wheels and/or individually hydraulically controllable wheel pairs, and
        a spine beam connector;
    wherein the second trailer stroke extender is arranged between the third hydraulic trailer and the fourth hydraulic trailer; and
    wherein the first cradle-to-beam connector of the second trailer stroke extender is connected to the spine beam connector of the third hydraulic trailer and the second cradle-to-beam connector of the second trailer stroke extender is connected to the spine beam connector of the fourth hydraulic trailer.

8. The hydraulic trailer system according to claim 7,
    wherein the second hydraulic trailer and the third hydraulic trailer are directly connected to each other; or
    wherein at least one further hydraulic trailer is arranged between the second hydraulic trailer and the third hydraulic trailer.

9. The hydraulic trailer system according to claim 8, wherein a longitudinal axis of the second hydraulic trailer and a longitudinal axis of the third hydraulic trailer extend coaxially with each other.

10. The hydraulic trailer system according to claim 6,
    wherein axles of adjacent wheels and/or adjacent wheel pairs of each of the first and second hydraulic trailers are spaced apart from each other in a longitudinal direction of the respective trailer over a wheel axle distance; and
    wherein a distance between the first cradle-to-beam connector and the second cradle-to-beam connector of the first trailer stroke extender in a direction parallel to the longitudinal direction of at least one of the first and second hydraulic trailers is 75%-125% of the wheel axle distance, optionally equal to the wheel axle distance.

11. The hydraulic trailer system according to claim 6, wherein each of the first and the second hydraulic cylinders of the first trailer stroke extender has an extended state and a retracted state; and wherein in the retracted state the load support surface of each of the first and the second hydraulic cylinders is arranged at a same level as or lower than the upper surface of the loading bed of the first and the second hydraulic trailers.

12. The hydraulic trailer system according to claim 6, wherein the cradle frame of the first trailer stroke extender further comprises a first cradle-to-bed connector and a second cradle-to-bed connector;
wherein each one of the first and second hydraulic trailers comprises a first loading bed connector on a first side of the loading bed and a second loading bed connector on a second side of the loading bed, wherein the second side is opposite to the first side; and
wherein the first cradle-to-bed connector of the first trailer stroke extender is connected to the second loading bed connector of the first hydraulic trailer and the second cradle-to-bed connector of the first trailer stroke extender is connected to the first loading bed connector of the second hydraulic trailer.

13. The hydraulic trailer system according to claim 6, wherein the cradle frame of the first trailer stroke extender has a first width in a lateral direction, and the loading bed of each of the first and second hydraulic trailers has a second width in a direction parallel to the lateral direction of the cradle frame, and wherein the first width of the cradle frame in the lateral direction is at least 50% of the second width of the loading bed of the respective hydraulic trailers to which the respective cradle frame is attached in the direction parallel to the lateral direction of the cradle frame, and optionally is at least 80% of the second width of the loading bed of the respective hydraulic trailers to which the respective cradle frame is attached in the direction parallel to the lateral direction of the cradle frame.

14. The hydraulic trailer system according to claim 6, wherein each of the first and second hydraulic trailers comprises a longitudinal spine beam defining a maximum loading bed bending moment capacity of the loading bed of the respective hydraulic trailer, wherein the longitudinal spine beam has a maximum beam bending moment capacity; and
wherein the cradle frame of the first trailer stroke extender has a maximum frame bending moment capacity of at least 50%, optionally at least 80% and preferably at least 100% of the maximum beam bending moment capacity of the longitudinal spine beam of at least one of the respective hydraulic trailers to which the first trailer stroke extender is connected.

15. The hydraulic trailer system according to claim 6, wherein the hydraulic trailer system further comprises:
a first monopile support, wherein the first monopile support is supported by the load support surfaces of the first and second hydraulic cylinders of the first trailer stroke extender.

16. The hydraulic trailer system according to claim 6, wherein the spine beam connector of the second hydraulic trailer to which the first trailer stroke extender is connected is a first spine beam connector, and wherein the second hydraulic trailer further comprises a second spine beam connector;
wherein the hydraulic trailer system further comprises:
a third hydraulic trailer, wherein the third hydraulic trailer comprises:
a loading bed having an upper surface,
a plurality of individually hydraulically controllable wheels and/or individually hydraulically controllable wheel pairs, and
a spine beam connector being arranged on a first side of the third hydraulic trailer; and
a second trailer stroke extender, comprising:
a cradle frame comprising a first cradle-to-beam connector and a second cradle-to-beam connector, wherein the first cradle-to-beam connector is adapted to be connected to the second spine beam connector of the second hydraulic trailer and the second cradle-to-beam connector is adapted to be connected to the spine beam connector of the third hydraulic trailer, the first and the second cradle-to-beam connectors being spaced apart from each other in a longitudinal direction of the second trailer stroke extender, and
a first hydraulic cylinder and a second hydraulic cylinder being adapted to move a trailer load in a vertical direction relative to the cradle frame over a single stroke length, wherein the first hydraulic cylinder and the second hydraulic cylinder are arranged in the cradle frame at a distance from each other in a lateral direction of the second trailer stroke extender; and
wherein the second trailer stroke extender is arranged between the second hydraulic trailer and the third hydraulic trailer, the first cradle-to-beam connector of the second trailer stroke extender is connected to the second spine beam connector of the second hydraulic trailer, and the second cradle-to-beam connector of the second trailer stroke extender is connected to the spine beam connector of the third hydraulic trailer.

* * * * *